United States Patent
Nicolai et al.

[11] Patent Number: 6,138,843
[45] Date of Patent: Oct. 31, 2000

[54] FRAME PIECE FOR A RACK OF A SWITCHING CABINET

[75] Inventors: Walter Nicolai, Buseck; Udo Münch, Sinn; Georg Vogel, Schwieberdingen, all of Germany

[73] Assignee: Rittal-Werk Rudolf Loh GmbH & Co. KG, Herborn, Germany

[21] Appl. No.: 09/293,112

[22] Filed: Apr. 16, 1999

[30] Foreign Application Priority Data

Apr. 17, 1998 [DE] Germany ............ 198 17 916

[51] Int. Cl.⁷ .................. A47F 5/00; A47B 47/00
[52] U.S. Cl. ............... 211/183; 211/182; 211/189; 211/26; 312/265.1; 312/265.3
[58] Field of Search .............. 211/26, 183, 189, 211/182; 312/265.1, 265.3, 265.4, 257.1; 361/829

[56] References Cited

U.S. PATENT DOCUMENTS

| | | | |
|---|---|---|---|
| 4,643,319 | 2/1987 | Debus et al. | 211/189 |
| 5,202,818 | 4/1993 | Betsch et al. | 312/265.1 X |
| 5,749,476 | 5/1998 | Besserer et al. | 211/26 |
| 5,761,797 | 6/1998 | Besserer et al. | 361/829 X |
| 5,806,946 | 9/1998 | Benner et al. | 312/265.3 |
| 5,930,972 | 8/1999 | Benner et al. | 211/189 X |
| 5,992,646 | 11/1999 | Benner et al. | 211/26 |
| 6,030,063 | 2/2000 | Benner | 211/26 X |
| 6,062,664 | 5/2000 | Benner | 312/265.1 |
| 6,070,957 | 6/2000 | Zachrai | 212/265.1 X |

*Primary Examiner*—Robert W. Gibson, Jr.
*Attorney, Agent, or Firm*—Pauley Petersen Kinne & Fejer

[57] ABSTRACT

A frame piece for a rack of a switching cabinet, which has a profile outside and a profile inside, the transitions of which lie at a distance from an outside corner edge of the rack and form a free space with the profile outside to the outside corner edge, for swinging a cabinet door and introducing edges of abutting paneling elements. A frame piece with many possibilities of variation with respect to fastening planes, fastening directions and stability is created according to this invention, because the frame piece is designed as having mirror image symmetry in cross-section with respect to an axis of symmetry which is at an angle of inclination to the rack diagonal. On both sides of the rack diagonal with the profile inside and profile outside, there are at least two profile sections that are at an angle with respect to one another, at least a part of which has fastening seats.

17 Claims, 2 Drawing Sheets

FRAME PIECE FOR A RACK OF A SWITCHING CABINET

BACKGROUND OF THE INVENTION

1. Field of the Invention

This invention relates to a frame piece for a rack of a switching cabinet having a profile outside and a profile inside, the transitions of which are at a distance from an outside corner edge of the rack and with the profile outside to the outside corner edge form a free space for swinging a cabinet door and for introducing edges of abutting paneling elements.

2. Description of Prior Art

A rack of a switching cabinet must satisfy greatly varied requirements, all of which must be fulfilled by the cross-sectional shape of the frame piece used. In an area of the bottom or cover frame, frame pieces which deviate from the cross-sectional form of the vertical frame piece can be used. Especially, in the case of the frame pieces which lie in a vertical direction of the rack, fastening possibilities directed in as many directions as possible are required. In addition, with minimizing the material expenditure, the frame piece must have optimum strength, preferably deformation strength, and yet be simply produced. Moreover, in the region of the vertical outside corner edges of the rack, sufficient free space should be available to introduce hinges for a cabinet door and to form and introduce sealing elements for the side walls or for a cabinet back wall.

A number of frame pieces are known for a rack of a switching cabinet, which partly fulfill the requirements given above, but do not provide a satisfactory solution in all respects. Frame pieces designed as open hollow profile sections perform significantly worse than closed hollow profile sections.

SUMMARY OF THE INVENTION

It is one object of this invention to create a frame piece for a rack of a switching cabinet which, especially when used as vertical frame piece, fulfills requirements for universal fastening possibilities, for example, sufficiently high strength with low material requirements and ease of manufacture.

In one preferred embodiment of this invention the frame piece is designed so that it has a cross-section with mirror image symmetry to an axis of symmetry, inclined at an angle with respect to the diagonal of the rack, and it has, on both sides of the rack diagonal, at least two profile sections positioned at an angle to one another with the profile inside and profile outside, of which at least one part has fastening seats.

The profile inside and profile outside, which start from the outsides of the rack that are at right angles with respect to one another, allow sufficient free space in the region of the outside corner edge to fulfill the requirements for swinging a cabinet door and for introducing beveled paneling elements, such as a cabinet door, side walls, a back wall and a covering wall. The profile sides of the profile insides, which are at an angle to one another, provide on both sides of the rack diagonal possibilities for fastening in various fastening planes and directions, with the angle between the profile sides being variable. The material requirement for the frame piece is low and the frame piece, which is easy to manufacture, still has a high deformation strength. Moreover, the profile inside and profile outside, with profile sides, provide an inside and outside seat into which mounting tracks and/or mounting parts can be incorporated with which, the system perforation is designed as rows of fastening seats with uniform distribution, can be extended and varied.

The stability of the frame piece can be increased without any significant material expenditure by designing the transitions from the profile inside to the profile outside as transition sections and/or by designing the transitions between the profile sections of the profile inside and of the profile outside as transition sections. Preferably, the transition sections are at the same angle to the profile sections to be connected.

Another improvement of the stability of the frame piece results from the profile sides of the profile inside and of the profile outside facing the rack diagonal being connected directly to one another, or the profile sides of the profile inside and of the profile outside facing the rack diagonal being connected to one another through parallel connecting pieces which are at a same distance to an axis of symmetry. When such connecting sections are present, the connecting pieces can lie on top of one another and can be connected to one another in order to increase the deformation strength of the frame piece.

In addition, the embodiments for fastening can be extended and varied because the transition sections and/or the connecting sections have additional fastening seats.

If the frame piece is produced as a stamped-bent component, then according to one of the embodiments wherein the case of frame piece is produced as a stamped-bent component, the point of impact and the point of connection are placed in the region of one of the connecting sections.

The mounting of the frame piece into the rack is facilitated and simplified because the angle of inclination is chosen to be 90° and the cross-section is chosen so that it has mirror image symmetry with respect to the rack diagonal, then one can use frame pieces in the rack with reversed profile inside and profile outside. Then, the sides of the profiles, the transition sections and the connecting sections of the profile inside and profile outside have fastening seats, which must not necessarily have the same design and distribution. Thus, the profile inside may preferably have a metric division and the profile outside may have a division in inches.

BRIEF DESCRIPTION OF THE DRAWINGS

This invention will be explained in more detail with the aid of four different embodiments of a frame piece, each shown in cross-section in FIGS. 1–4.

DESCRIPTION OF PREFERRED EMBODIMENTS

In all practical examples, AS1 and AS2 designate the two outsides of a rack abutting at right angles, the rack diagonal RGD of which is shown as a bisector of the angle. The two outsides AS1 and AS2 form an outside corner edge AEK, but this is not influenced adversely by the frame piece with a profile outside 20 and leaves sufficient free space FR. The profile outside 20 and the profile inside 10 of the frame piece are designed to have mirror image symmetry to an axis of symmetry SA, which intersects with the outsides AS1 and AS2 of the rack in the region of the outside edges AK1 and AK2. This axis of symmetry SA is at an angle of inclination α to the rack diagonal RGD.

Figure 1:
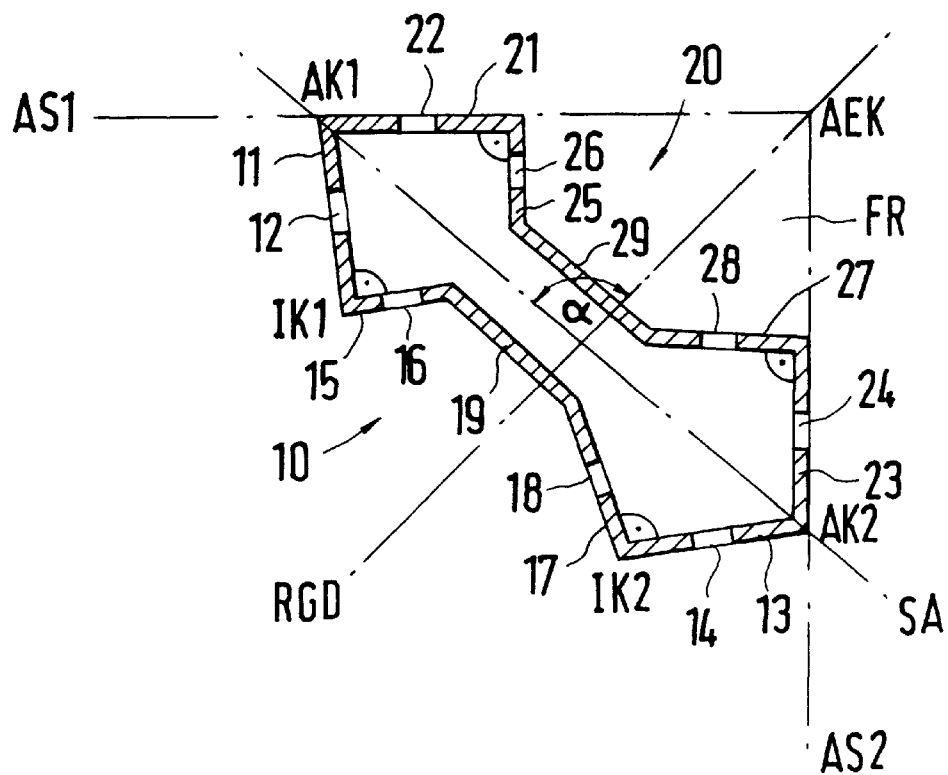
Figure 2:
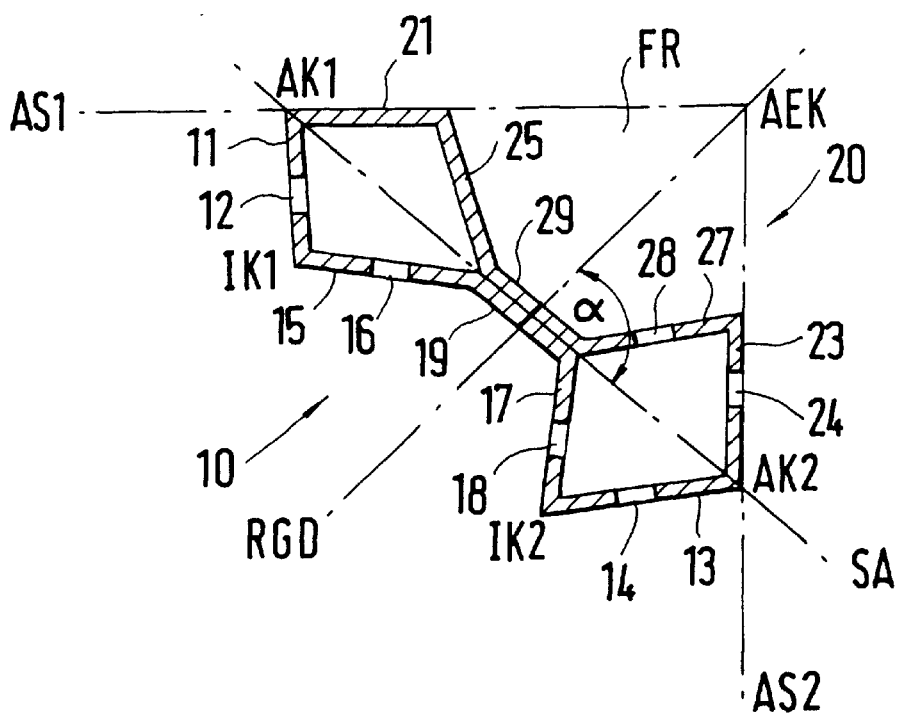
Figure 3:
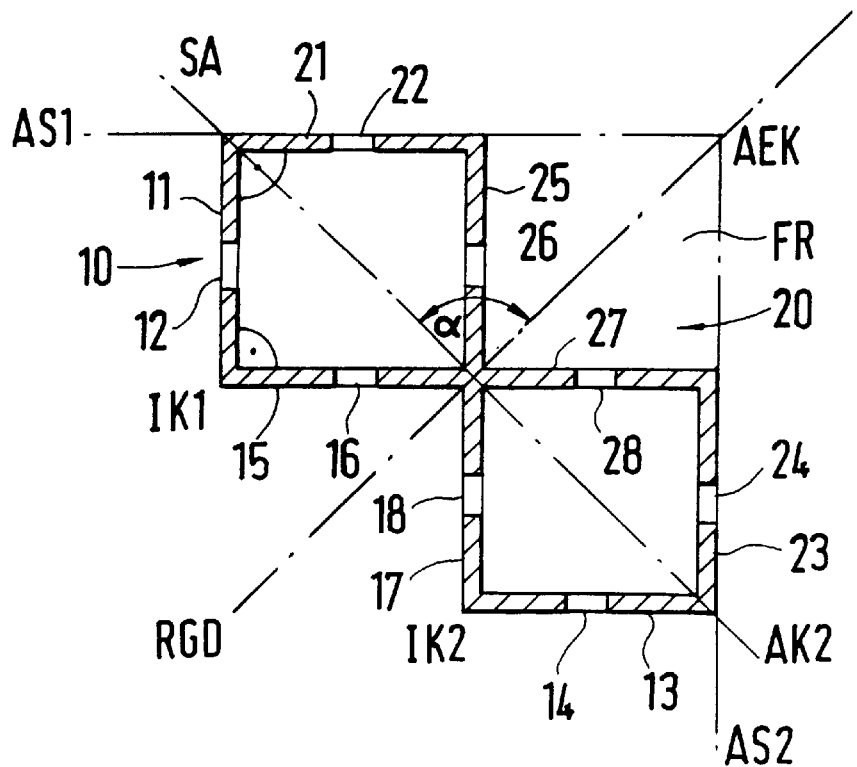
Figure 4:
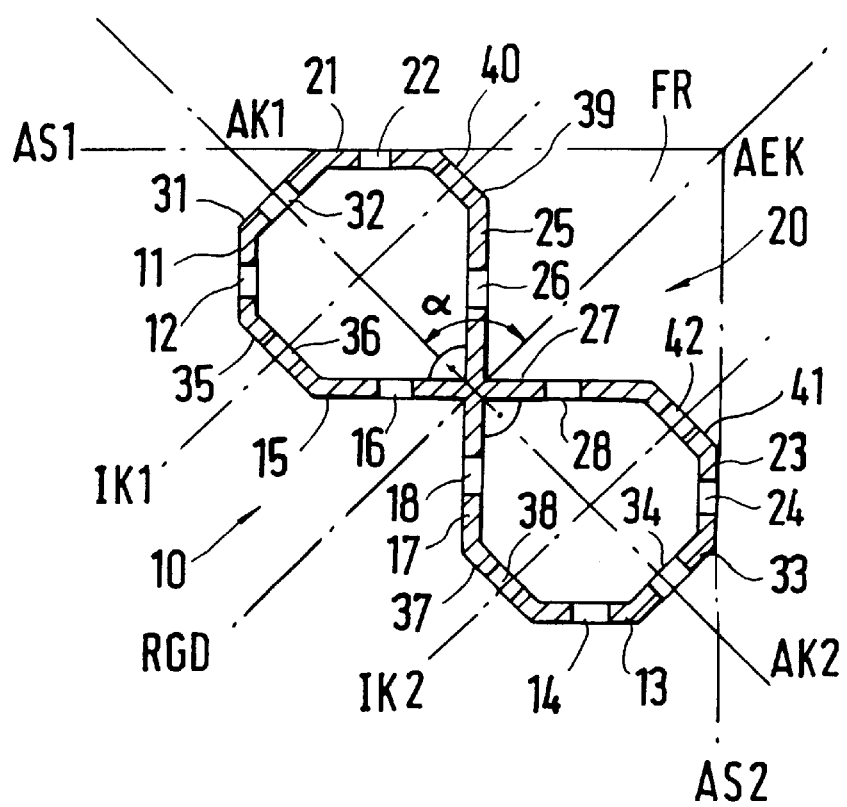

In the practical examples according to FIG. 1 and FIG. 2, the outside edge AK1 has a larger distance to the outside corner edge AEK than the outside edge AK2 and deviates from 90° by the angle of inclination α, while in the practical examples according to FIGS. 3 and 4, the distances of the outside edges AK1 and AK2 from the outside corner edge AEK has the same magnitude and the angle of inclination α=90°, that is, the frame piece has a cross-section which has a mirror image symmetry to the rack diagonal RGD.

In the embodiment shown in FIG. 1, the profile inside 10 and the profile outside 20 continue into outside edges AK1 and AK2 with profile sides 11 and 21, and 13 and 23, respectively. At these profile sides 11 and 13, and 21 and 23, respectively, profile sides 15 and 17, and 25 and 27, connect at a right angle. The profile sides 15 and 17, and 25 and 27, are connected to one another through a connecting section 19 and 29, respectively. The connecting sections 19 and 29 run parallel to one another and parallel to the axis of symmetry SA. The profile sides 11, 13, 15, 17, 21, 23, 25, 27 have fastening seats 12, 14, 16, 18, 22, 24, 26, 28, which can have any arbitrary design and can have any arbitrary direction. However, they can also be designed as identical series of system fastenings and can be directed toward one another. The distance between the fastening seats 12 and 16 from the inner edge IK1 and the distance of the fastening seats 14 and 18 from the inner edge IK2 can be selected to be the same or different. The same applies to the design of the distances on the profile outside 20. The distances of the profile inside 10 and profile outside 20 can be chosen to be identical or different, without sacrificing the mirror image design of the frame piece cross-section to the axis of symmetry SA.

As shown in FIG. 2, the connecting sections 19 and 29 can also lie directly on top of one another and can be connected with one another, where, in the region of one connecting section, such as connecting section 19, the stamped-bent part can be assembled and closed. The profile sides 11 and 15, and 21 and 25, form an obtuse angle while the profile sides 13 and 17, and 23 and 27, meet at an acute angle. Individual profile sides, such as 21 and 25, may also be without fastening seats. The angle of inclination α to the rack diagonal RGD may be the same or opposite. However, it can also be 90° and the unsymmetrical design to the rack diagonal RGD can be retained. The obtuse angle and the acute angle between the profile sides can be adapted and optimized corresponding to the requirements for the fastening planes and fastening directions as well as to the stability of the frame piece.

The frame piece according to FIG. 3 has a cross-section which has mirror image symmetry to the axis of symmetry SA and to the frame diagonal RGD with two essentially rectangular hollow spaces. The profile sides 11, 13, 15, 17, 21, 23, 25 and 27 can have the same width and can all have fastening seats 12, 14, 16, 18, 22, 24, 26, 28. The profile sides 11, 17, 23 and 25 run parallel to the outside AS2 and the profile sides 13, 15, 23 and 27 run parallel to the outside AS1. The profile inside 10 and profile outside 20 are identical, so that frame pieces with the sides reversed can be used in the rack. With this design of the cross-section, the profile inside 10 and the profile outside 20 can also be designed with fastening seats distributed and/or designed differently. The angle α in these cases is always 90°.

In the practical example according to FIG. 4, the outside edges AK1 and AK2, the inside edges IK1 and IK2, as well as the outside edges of the frame piece according to FIG. 3, corresponding to the inside edges IK1 and IK2 are chamfered and replaced by transition sections 31, 33, 35, 37, 39 and 41 which connect the abutting profile sides and are at the same angle of 135° with respect to them. The transition sections 31, 33, 35, 37, 39 and 41 can also have fastening seats 32, 34, 36, 38, 40 and 42 to expand the possibilities of fastening. The profile sides 15, 17, 25 and 27 abut each other at the intersection between the axis of symmetry SA and the rack axis RGD and are there connected with one another rigidly, as in the embodiment shown in FIG. 3.

As shown by the practical examples, the design of the frame piece cross-section as having mirror image symmetry to an axis of symmetry SA, which is at an angle of inclination cc to the frame rack diagonal RGD, in combination with having always two profile sides on both sides of the rack diagonal RGD of profile inside 10 and profile outside 20 provides many possible designs with respect to fastening planes, fastening directions and the stability of the frame piece, without restricting the free space FR toward the outside corner edge AEK.

What is claimed is:

1. In a frame piece for a rack of a switching cabinet having a profile outside and a profile inside with transitions positioned at a distance from an outside corner edge of the rack and forming with the profile outside toward the outside corner edge a free space for swinging a cabinet door and introducing edges of abutting paneling elements, the improvement comprising:

the frame piece having a mirror-image symmetry in a cross-section to an axis of symmetry (SA) which is at an angle of inclination (α) with respect to a rack diagonal (RGD); and on both sides of the rack diagonal (RGD), with the profile inside (10) and the profile outside (20), the frame piece having at least two profile sections (11, 13 and 21, 23, and 15, 17 and 25, 27), which are at a second angle to one another and at least a portion of the profile sections (11, 13 and 21, 23, and 15, 17 and 25, 27) having fastening seats (12, 14, 16, 18, and 22, 24, 26, 28).

2. In the frame piece according to claim 1, wherein the transitions from the profile inside (10) to the profile outside (20) are designed as transition sections (31, 33).

3. In the frame piece according to claim 2, wherein the transitions between the profile sections (11 and 15; 13 and 17; 21 and 25; 23 and 27) of the profile inside (10) and of the profile outside (20) are designed as transition sections (35, 37).

4. In the frame piece according to claim 3, wherein the transition sections (31, 33, 35, 37) are at a same angle to the connecting profile sections (11, 21; 11, 15; 13, 17; 13, 23; 23, 27; 21, 25).

5. In the frame piece according to claim 4, wherein a plurality of profile sides (15, 17 and 25, 27) of the profile inside (10) and of the profile outside (20) facing the rack diagonal (RGD) are connected directly to one another.

6. In the frame piece according to claim 5, wherein the profile sides (15, 17 and 25, 27) of the profile inside (10) and of the profile outside (20) facing the rack diagonal (RGD) are connected to one another through a plurality of connecting sections (19, 29) which run parallel and are at a same distance to the axis of symmetry (SA).

7. In the frame piece according to claim 6, wherein at least one of the transition sections (31, 33, 35, 37) and the connecting sections (19, 29) have additional fastening seats (32, 33, 36, 38).

8. In the frame piece according to claim 7, wherein the connecting sections (19, 29) lie on top of one another and are connected to one another.

9. In the frame piece according to claim 8, wherein when the frame piece is produced as a stamped-bent component, a point of impact and a point of connection are placed in a region of one of the connecting sections (19 or 29).

10. In the frame piece according to claim 9, wherein the angle of inclination ($\alpha$) is 90°.

11. In the frame piece according to claim 10, wherein the cross-section has mirror image symmetry with respect to the rack diagonal (RGD).

12. In the frame piece according to claim 1, wherein the transitions between the profile sections (11 and 15; 13 and 17; 21 and 25; 23 and 27) of the profile inside (10) and of the profile outside (20) are designed as transition sections (35, 37).

13. In the frame piece according to claim 2, wherein the transition sections (31, 33, 35, 37) are at a same angle to the connecting profile sections (11, 21; 11, 15; 13, 17; 13, 23; 23, 27; 21, 25).

14. In the frame piece according to claim 1, wherein a plurality of profile sides (15, 17 and 25, 27) of the profile inside (10) and of the profile outside (20) facing the rack diagonal (RGD) are connected directly to one another.

15. In the frame piece according to claim 1, wherein the profile sides (15, 17 and 25, 27) of the profile inside (10) and of the profile outside (20) facing the rack diagonal (RGD) are connected to one another through a plurality of connecting sections (19, 29) which run parallel and are at a same distance to the axis of symmetry (SA).

16. In the frame piece according to claim 1, wherein the angle of inclination ($\alpha$) is 90°.

17. In the frame piece according to claim 16, wherein the cross-section has mirror image symmetry with respect to the rack diagonal (RGD).

* * * * *